United States Patent [19]

Harig

[11] E Re. 31,050

[45] Reissued Oct. 5, 1982

[54] HOISTING DEVICE

[75] Inventor: Manfred Harig, Lindlar-Linde, Fed. Rep. of Germany

[73] Assignee: N.V. Western Gear Europe, S.D., Aartselaar, Belgium

[21] Appl. No.: 958,696

[22] Filed: Nov. 8, 1978

Related U.S. Patent Documents

Reissue of:

[64] Patent No.: 4,074,582
Issued: Feb. 21, 1978
Appl. No.: 722,764
Filed: Sep. 13, 1976

[30] Foreign Application Priority Data

Sep. 26, 1975 [BE] Belgium ..... 254583
Dec. 1, 1975 [BE] Belgium ..... 254684

[51] Int. Cl.[3] ..... F16H 55/36; F16H 55/62

[52] U.S. Cl. ..... 474/10; 474/9; 226/200

[58] Field of Search ..... 74/230.24, 230.17 M, 74/244; 254/138, 191; 242/155 R, 155 BW, 155 M; 226/182; 104/199, 209, 211, 212, 222, 224

[56] References Cited

U.S. PATENT DOCUMENTS

| | | | |
|---|---|---|---|
| 3,034,767 | 5/1962 | Gordon | 254/138 |
| 3,249,335 | 5/1966 | Eisenhauer | 74/230.24 |
| 3,250,514 | 5/1966 | Hamalainen | 74/230.24 |
| 3,382,398 | 5/1968 | Austin et al. | 226/182 X |
| 3,635,441 | 1/1972 | Haines | 254/138 |
| 3,836,120 | 9/1974 | Niskin | 74/230.17 M |
| 3,861,228 | 1/1975 | Adams | 74/230.17 M |
| 3,965,767 | 6/1976 | Rinio | 254/138 X |
| 3,966,170 | 6/1976 | McKenna | 74/230.17 M |
| 4,077,271 | 3/1978 | Mathews | 74/230.24 |

FOREIGN PATENT DOCUMENTS

| | | | |
|---|---|---|---|
| 325438 | 9/1920 | Fed. Rep. of Germany . | |
| 367654 | 1/1923 | Fed. Rep. of Germany | 74/230.24 |
| 429820 | 5/1925 | Fed. Rep. of Germany . | |
| 449153 | 8/1927 | Fed. Rep. of Germany . | |
| 658572 | 6/1929 | France | 74/230.24 |
| 874311 | 8/1942 | France | 74/230.24 |
| 119296 | 8/1927 | Switzerland . | |

*Primary Examiner*—Leslie Braun
*Attorney, Agent, or Firm*—E. Wallace Breisch

[57] ABSTRACT

[The invention pertains to a hoisting device, characterized by the fact that it mainly consists of a housing to which the load is suspended, and in this housing a driving pulley consisting of two half pulleys for the cable, which is suspended from a fixed point, whereby this driving pulley is provided with means which press the cable uniformly or practically uniformly into the driving pulley over a large arc, and with means which press aforesaid half pulleys away from each other at the locations where the cable enters and leaves the pulley, in such a manner that no friction occurs when the cable enters or leaves the driving pulley, whereby this pressing apart is performed in such a manner that no or practically no increase of pressure occurs on the cable on the other side of the pulley.]

*A hoisting device having axially separable rotatable pulley portions jointly defining a cable groove and including first means to separate the pulley portions during one portion of pulley rotation to provide space for a cable to enter and leave the groove and having other means to bias the pulley portions towards each other in the other portions of pulley rotation to grip the cable in the groove.*

37 Claims, 9 Drawing Figures

1
13
IV
11
6
9
10
28
26
24
25
22
2
5
29
4
30
27
9
10
3
14
15
6
IV 3
11
13
12
4
2
8
7
6

HOISTING DEVICE

Matter enclosed in heavy brackets [ ] appears in the original patent but forms no part of this reissue specification; matter printed in italics indicates the additions made by reissue.

*DESCRIPTION*

*This is an application for a reissue of U.S. Pat. No. 4,074,582, issued Feb. 21, 1978 on U.S. application Ser. No. 722,764, filed Sept. 13, 1976. Priority was claimed under 35 U.S.C. 119 for U.S. Pat. No. 4,074,582 for Belgium Patent Application Ser. No. 254,583, filed Sept. 26, 1975 and for Belgium Patent Application Ser. No. 254,684, filed Dec. 1, 1975. Priority under 35 U.S.C. 119 on the basis of said Belgium Patent Application is additionally claimed for this application.*

The present invention relates to a hoisting device of the type which is more particularly intended for the vertical displacement of loads and which consists of a housing or frame containing amongst others a rotatably fitted driving pulley for a cable or suchlike, whereby means are provided in order to obtain a good cooperation between aforesaid driving pulley and cable.

In a first well known hoisting device, the cable is wound several times around the pulley for this purpose, but this gives rise to considerable and well known disadvantages such as the difficulty of maintaining the cable in the correct location, the wear produced thereby and the relatively elaborate construction.

It has already been suggested, in order considerably to simplify the construction, only to wind the cable once around aforesaid driving pulley, whereby means are provided for pressing this cable against the driving pulley, or respectively in a circumferential groove of this driving pulley, in order thus to increase the friction between cable and pulley. In well known forms of embodiment (German Pat. Nos. 325,438, 429,820, 449,153 and Swiss Pat. No. 119,296) such a hoisting device consists of a split driving pulley of which both halves are permanently pressed towards each other, thus firmly gripping and driving the cable, and whereby means are often provided for appropriately pulling the pulley halves apart in order to facilitate the entering and removing of the cable, respectively into and out of the pulley.

Such known devices have the disadvantage that the pressure exerted on the cable is far from being regularily distributed.

*The present invention includes a pulley having two relatively movable pulley halves between which cable is received. Mechanical means are provided within the pulley to permit free entrance and exit of cable from the pulley; however, since such means are within the pulley the size of the hoist housing is at a minimum and protects the pulley from the environment. Further the pulley separating means is located to rotate at a speed close to the rotational speed of the pulley members so that a minimum of frictional wear and heat occurs therebetween. In addition a large area of contact between the cable and the pulley members is uniformly maintained throughout the major portion of the rotational travel of said pulley.*

A first object of the invention is to build a hoisting device whereby at least one half pulley of the pulleys halves which are pressed towards each other is made so as to be distortable, it being understood that such distortions shall be only slight and local, or in other words is successively displaced along the circumference of the pulley, and whereby the distortion is such as to never exceed the limit of elasticity of the materials used.

One thus obtains on the one hand, that the cable is gripped, or respectively driven, uniformly or practically uniformly over a large arc, by the means which press the pulley halves with a predetermined pressure towards each other, whereas on the other hand, the separating of the pulley halves on one side is such, that no or practically no pressure increase occurs on the cable at the other side of the pulley halves.

*A further object of this invention is to provide a new and improved hoist device having a pulley with movable pulley halves receiving a cable therebetween with mechanical means for receiving and releasing the cable with respect to the pulley being located within the pulley.*

Another object of the invention is, that in a first form of embodiment, aforesaid means which keep the pulley halves apart are displaced towards the center of the pulleys in such a manner, that the local circumferential velocity of these means and the local circumferential velocity of the driving pulley are practically equal to each other, so that the friction and consequently also the generation of heat remain as small as possible, so that the hoisting device according to the invention can be maintained in continuous use.

A further object of the invention is that in a second form of embodiment, aforesaid means which maintain the pulley halves apart are displaced towards the outer circumference of the pulleys in such a manner that there is no difference in circumferential velocity between these means and the driving pulley, so that similarly in this case no detrimental friction or heat generation is caused.

Yet a further object of the invention is that the groove of the split driving pulley increases progressively towards the inside, one and other in such a manner that the cable is always pressed towards the bottom of the groove, due to the lateral pressure of the pulley halves.

The hoisting device which boasts aforesaid as well as other characteristics shall for this purpose mainly consist of a housing to which the load is suspended, and in this housing a driving pulley consisting of two pulley halves for the cable which is suspended from a fixed point; whereby this driving pulley is provided with means which grip the cable uniformly or practically uniformly in the pulley over a large arc, and with means which press the pulley halves apart at the locations of entry and release of the cable in such a manner that the pressure on the cable at the other side of the pulley is not or practically not increased.

In order to show more clearly the characteristics of the invention, a few forms of embodiment of the device according to the invention are described hereinafter, merely as examples and without the slightest intent at limitation, with reference to the appended drawings in which.

Figures 1, 2, 4:
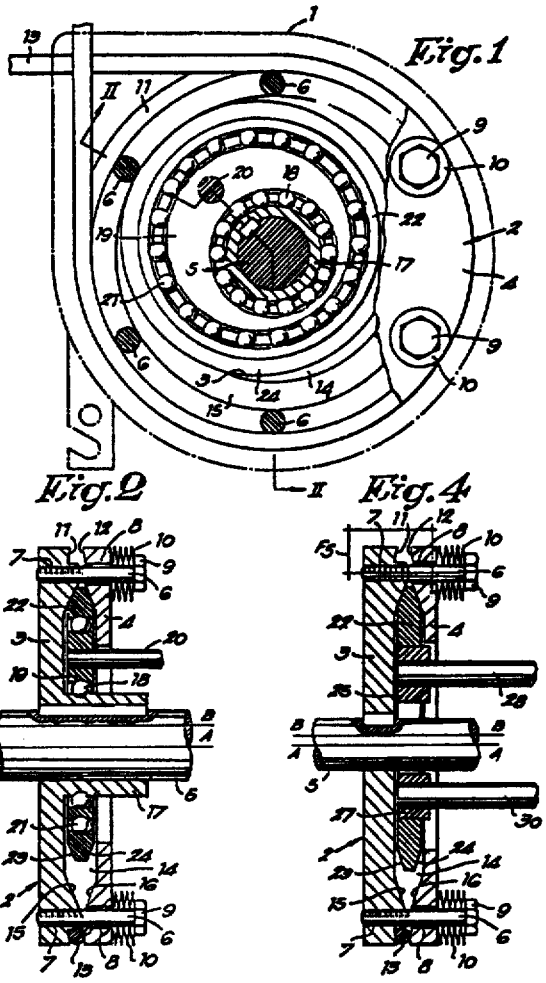
FIG. 1 shows a schematic and partially cutaway front view of a device according to the invention.
FIG. 2 shows a cross section according to line II—II in FIG. 1.
FIG. 4 is a cross section according to line IV—IV in FIG. 3.

In FIGS. 1 and 2 the hoisting device according to the invention mainly consists of a housing 1 which is shown schematically. In this housing shafts are fitted, which are driven by appropriate means, such as for instance a motor, attached to housing 1, but not shown.

The hoisting mechanism itself consists of a driving pulley 2 with dovetail shaped groove, itself consisting of two elements or pulley halves *or pulley members*, respectively 3 and 4, of which element 3 is appropriately fixed to a shaft 5, whereas element 4 is attached to element 3 by means of screw bolts 6. The latter each cooperate with a threaded bore 7 which is provided in element 3 of the pulley and pass freely through a hole 8 in element 4 of the driving pulley. Finally, a spring 10 is fitted between the head 9 of each bolt 6 and aforesaid element 4, which in the present case consist of dished springs.

It is clear, that the force with which the two pulley halves 3 and 4 are pressed towards each other is adjustable by the screwing in or out of aforesaid bolts 6, whereby this force shall be such that the cable is gripped without slippage between elements 3 and 4 and without any harmful distortion being caused to the cable.

Figure 5:
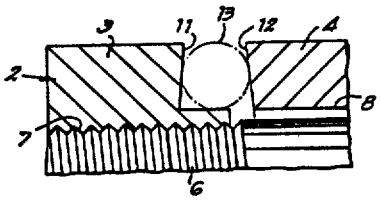
FIG. 5 shows to a larger scale that part of FIG. 4 indicated by F5.
Figure 6:
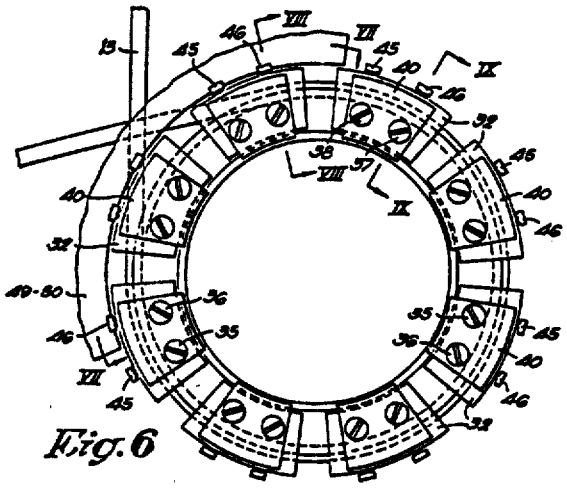
FIG. 6 is a similar view to that of FIG. 1, but for yet a further alternative form of embodiment.
Figure 7:
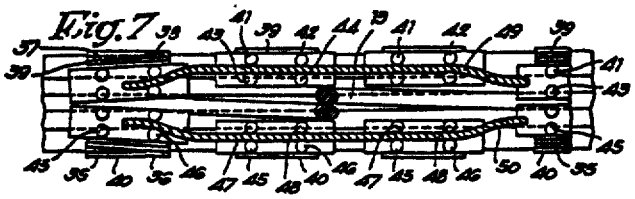
FIGS. 7, 8 and 9 show cross sections, respectively according to lines VII—VII, VIII—VIII and IX—IX in FIG. 6.
Figure 9:
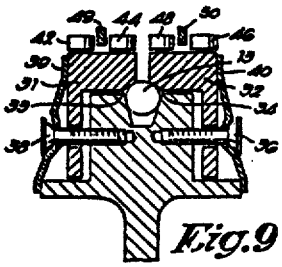
Figure 8:
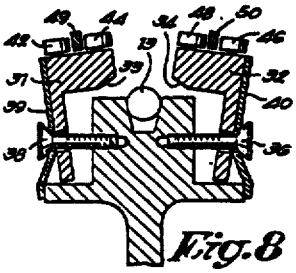

The pulley halves 3 and 4 are provided on the inside and over the entire circumference with a bevelled surface, respectively 11 and 12, with which the cable 13 can cooperate. As is most apparent in FIG. 5, these surfaces have been provided in such a manner that they form a conical groove which widens towards the inside in dovetail cross sectional shape, in such a manner that in consequence of the lateral pressure of the two pulley halves on the cable, the latter is permanently stressed towards the bottom of the groove, so that any possibility of the cable jumping the groove is totally eliminated. Between elements 3 and 4 of driving pulley 2 a space 14 is provided which consists for the major part of parallel surfaces of elements 3 and 4, whereby these surfaces are provided, towards the circumference of said elements, in the present case with conical parts, respectively 15 and 16. Each element 3 and 4 is thus provided as it were with a space in dinner plate shape.

In this form of embodiment, a ball bearing or suchlike 18 is fitted on shaft 5, or respectively on hub 17 of element 3, and carries an excentric disc 19. The latter is attached by means of a pin, rod, or suchlike 20 to the housing of the housing device in some manner not shown, one and other in such a manner that disc 19 is immovable with respect to this housing. This disc also runs a ball bearing or suchlike 21, which is fitted in a ring 22, provided at its circumference with conical surfaces, respectively 23 and 24.

Excentric disc 19 is provided in such a manner, that ring 22, which is maintained fixed with respect to housing 1, acts upon the conical surfaces 15 and 16 of the driving pulley 2 in the course of the rotation of the latter, and such precisely between the locations where cable 13 enters and respectively leaves the driving pulley. One thus obtains, that at the locations where the cable enters and leaves the pulley, both elements 3 and 4 are pressed away from each other in order to permit the cable to enter and to leave the pulley freely without friction, whereas at the other side of the driving pulley, due to the presence of bolts 6 and of springs 10, cable 13 is firmly gripped between surfaces 11 and 12 and such over a very large arc and with a uniform or practically uniform pressure.

[Due to the fact that ring 22 is of relatively large diameter with respect to the diameter of aforesaid opening 14, one simultaneously obtains that the difference in circumferential velocity of surfaces 23 and 24 with respect to surfaces 15 and 16 of elements 3 and 4 is so small, that only a very slight and permissible generation of heat occurs between ring 22 and elements 3 and 4.]

[In this case surfaces 15 - 16 and 23 - 24 pass ideally over each other so that friction, heat and wear are reduced to a bare minimum.]

*In operation, with the pulley 2 being rotated counterclockwise to climb a vertical extending portion of cable 13 such as shown in FIG. 1 and with such vertical portion of cable 13 being properly supported, counterclockwise rotation of pulley 2 by shaft 5 results in simultaneous counterclockwise rotation of ring 22 due to the bias of spring 10 forcing surfaces 15 and 16 into engagement with surfaces 23 and 24 respectively. With, for example, axis B—B being offset at substantially 45 degrees from the axis A—A in the second quadrant, as is illustrated in FIGS. 1 and 2, the selected radial distance between axis A—A and B—B and the selected diameter of ring 22; surfaces 23 and 24 of ring 22 will be in engagement with surfaces 15 and 16 throughout a sufficient extent of the second quadrant of movement of the simultaneously rotating pulley 2 and ring 22. In addition ring 22 is of a thickness or width throughout the radial extent of engagement by surfaces 15 and 16 which is greater than the distance between surfaces 15 and 16 along an axis parallel to axis A—A or B—B when pulley elements 3 and 4 are biased into engagement with cable 13 by springs 10. Accordingly, upon surface 16 engaging surface 24, the portion of pulley member 4 laterally adjacent such area of engagement is displaced laterally outwardly from the pulley element 3 to provide the desired lateral separation of surfaces 11 and 12 and opening of the cable groove. Such displacement of a segment of element 4 is maintained throughout the entire second quadrant of rotation of element 4 and each section of element 4 entering the second quadrant is so displaced and remains so displaced as it traverses the second quadrant. In order to provide for such displacement of pulley element 4 for a normal product life of the pulley 2, pulley element 4 is formed from a suitable material having a modulus of elasticity to permit such repeated displacement or flexing of sequential portions of element 4 without causing undesirable permanent deformation or premature failure of element 4.*

*In the preferred embodiment described hereinabove and illustrated in FIGS. 1 and 2 the engagement of ring 22 with the surfaces 15 and 16 is through an arcuate extent to provide for separating surfaces 15 and 16 throughout the second quadrant. With such structure a uniform side pressure is exerted upon the cable 13, due to the bias of springs 10, throughout the remaining substantially 270 degrees of travel of the pulley 2. If desired, however, axis B—B can be displaced from the axis A—A from the relative positions as shown. Thus, depending upon the location of the axis B—B relative to the axis A—A, surfaces 15 and 16 may be separated for more or less than a full quadrant as desired and accordingly the arcuate extent of the cable 13 engaging surfaces 11 and 12 will also vary. In addition, any suitable angle for surfaces 23 and 24 can be employed to obtain the desired separation of surfaces 15 and 16.*

*Although the bias engagement between elements 3 and 4 and ring 22 causes the ring 22 to rotate, since ring 22 is on a rotative axis B—B displaced from axis A—A and as the mean or average diameter of surfaces 15–16, ring 22 will rotate at a higher number of revolutions than the pulley 2 per unit of time. Such difference in relative revolutions and the displacement of element 4 causes a certain degree of relative movement between the surfaces 23–24 and 15–16 whereby heating of the engaged members occurs. As is known high heat generation can cause damage to the pulley 2; however, heat losses less than that required to damage the pulley are also undesired since they constitute a power loss. In the structure shown in FIGS. 1 and 2, axis B—B is located within the periphery of shaft 5 so that the offset of axis B—B from axis A—A is at a minimum, i.e. a nominal offset, so that the difference in such relative rotation is relatively minor and no adverse heating of the pulley or excessive power losses occur. Inasmuch as circumferentially continguous segments of the pulley element 4 are sequentially displaced by the ring 22 the bores 8 are of a diameter to permit the desired displacement of element 4 without causing element 4 to engage a bolt 6 to undesirably limit such displacement.*

Figure 3:
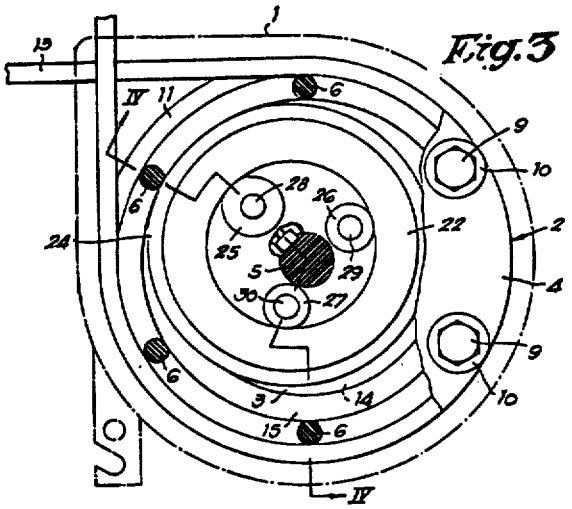
FIG. 3 is a similar view to that of FIG. 1, but for an alternative form of embodiment.

In FIGS. 3 and 4, a form of embodiment is shown, with which similar results are obtained as those described with reference to FIGS. 1 and 2, but in which case aforesaid ring 22 is supported by rollers, respectively 25, 26 and 27, which rotate freely around respective shafts 28, 29 and 30, which are attached in an appropriate but not shown manner to the casing of the hoisting device.

In these two forms of embodiment we thus obtain that the acutal driving pulley rotates around a shaft A—A, whereas ring 22 rotates jointly around a shaft B—B either on the excentric disc 19, or respectively on the excentrically located rollers 25-26-27.

It is obvious that the closer shafts A—A and B—B lie together, the slighter the friction will be arising between ring 22 and elements 3 and 4. The half pulleys 3 and 4 are moved over ring 22, in order that these half pulleys should thus be opened in successive locations and permit the entry and the leaving of the cable in and out of the driving pulley to occur without friction.

According to the present invention at least one of the half pulleys, for instance half pulley 4, shall be made of some distortable material, whereby this distortion shall however be so slight that the limit of elasticity of the material used will never be exceeded.

It is obvious that the half pulley which is made of such distortable material shall always be subjected to such distortion at successive locations of the circumference, due to the location influence of ring 22.

It has thus been obtained, on the one hand, that by means of springs 10 the cable is gripped over a large arc with uniform or practically uniform pressure, whereby this pressure which is exerted by the half pulleys upon the cable has been determined in advance, by the screwing in or out of the bolts 9, in such a manner that a slippage free drive of the cable is obtained without distortion of the latter, whereas on the other hand, the spreading of the half pulleys on one side, by means of aforesaid ring 22 and by local distortion of one half pulley, is such that no or practically no pressure increase occurs on the cable at the other side of the pulley.

It is obvious that the second half pulley may be made undistortable, or that both half pulleys may be made of some distortable material.

In the example of FIGS. 1 to 5, ring 22 on the one hand, and elements 3 and 4 on the other hand, are provided with bevelled surfaces which are in contact with each other. It is however obvious, that instead of such a ring 22 with bevelled surfaces, a completely cylindrical ring could be used, in which case surfaces 15 and 16 should of course also be vertical with respect to the centerline of shaft A—A.

In FIGS. 6 to 9 a further alternative form of embodiment is finally shown, whereby the cable pulley is of integral construction and whereby spring elements are used around the entire circumference which firmly press the cable into the groove with uniform or practically uniform pressure, and whereby these spring elements are opened at the locations where the cable leaves the pulley or comes into contact therewith, for instance by means of cams, so that this opening has no influence upon the pressure exerted by said spring elements upon the cable.

In these Figures, the spring elements are made up of pairs of blocks 31–32 which are provided with bevelled surfaces, respectively 33 and 34, which can cooperate with the cable 13 in order to grip it tightly, whereby these small blocks are each fitted in a mobile manner upon the body of screws 35–36 and 37–38 which are screwed into the pulley itself 2 and whereby these screws can also be used for the fixing of leaf springs, respectively 39–40, which, as can clearly be seen on the drawing, supply the required pressure for gripping the cable.

In this case, each little block is further provided with rollers, respectively 41–42, 43–44 and 45–46, 47–48, which can cooperate with aforesaid guides or cams, respectively 49–50.

In this case also, the cable is pressed by means of springs 39 and 40 into the groove of driving pulley 2, so as to be driven without slippage by the latter, whereas the entrance and the leaving of the cable can also take place without friction by the pressing open of blocks 31 and 32 at the locations where the cable enters the driving pulley, or respectively leaves the latter.

The invention is by no means limited to the forms of embodiment described as examples and illustrated in the drawings, but such a hoisting device may be constructed in many forms and dimensions, without going beyond the scope of the present invention.

What I claim is:

1. Hoisting device, characterized by the fact that it mainly consists of a housing to which [the load is] *a load is adapted to be* suspended and in this housing a driving pulley *rotatable about a first axis and* consisting of two half pulleys for a cable, which is *adapted to be* suspended from a fixed point, whereby this [driving] pulley is provided with means which *continuously* press the cable *substantially* uniformly [or practically uniformly] into the [driving] pulley [over] *throughout* a large arc, and with means which *continuously* press aforesaid half pulleys away from each other [at] *with respect to said first axis throughout a smaller arc which extends between* the locations where the cable enters and leaves the pulley, in such a manner that *substantially* no friction occurs when the cable enters or leaves the [driving] pulley, whereby this pressing apart is performed in such a manner that *substantially* no [or practically no] increase of pressure occurs on the cable on the other side of the pulley *and whereby the sum of the large arc and the smaller arc equals 360 degrees.*

2. Hoisting device according to claim 1, characterized by the fact that *at least an outer peripheral portion of* one half pulley is [made of some distortable material, whereas the other half pulley is made nondistortable] *resiliently deformable in a direction, with respect to said first axis, towards and away from the other half pulley.*

3. Hoisting device according to claim 1, characterized by the fact that *at least an outer peripheral portion of* both half pulleys are [made of some distortable material] *resiliently deformable in a direction, with respect to said first axis, towards and away from each other.*

4. Hoisting device according to claim 2, characterized by the fact that [aforesaid distortable half pulley is an integral part] *said one half pulley is substantially entirely resiliently deformable.*

5. Hoisting device according to claim 3, characterized by the fact that [aforesaid distortable half pulleys are each integral parts] *both half pulleys are substantially entirely resiliently deformable.*

6. Hoisting device according to claim 1, characterized by the fact that the means for pressing aforesaid half pulleys apart consist of a [roller or] ring which is provided between the half pulleys and inside the outer circumference [thereof] *of the half pulleys.*

7. Hoisting device according to claim 6, characterized by the fact that aforesaid [roller or] ring is fitted within a space which is hollowed out in aforesaid half pulleys.

8. Hoisting device according to claim 7, characterized by the fact that aforesaid spaces in each half pulley are of dinner plate shape, with the opening of the dinner plates directed towards each other *with respect to said first axis.*

9. Hoisting device according to claim 7, characterized by the fact that aforesaid [roller or] ring is of entirely cylindrical shape.

10. Hoisting device according to claim 7, characterized by the fact that aforesaid [roller or] ring is provided along its circumference with bevelled surfaces which correspond to the [conicity] *outer peripheral configuration* of aforesaid spaces [or respectively with the bevel of the dinner plate borders].

11. Hoisting device according to claim 7, characterized by the fact that aforesaid [roller or] ring is fitted on a bearing around a disc which is excentric with respect to [the drive shaft of the drive pulley] *said first axis and extends in a direction generally parallel thereto,* but which itself is fitted on a bearing [in the center of the driving pulley or on the shaft of the driving pulley] *disposed radially inwardly from said first mentioned bearing.*

12. Hoisting device according to claim 11, characterized by the fact that aforesaid excentric disc is maintained fixed with respect to the housing of the hoisting device.

13. Hoisting device according to claim 7, characterized by the fact that aforesaid [roller or] ring rests on three rollers which are excentrically located with respect to [the center line of the driving pulley] *said first axis and extend in a direction generally parallel thereto.*

14. Hoisting device according to claim 13, characterized by the fact that aforementioned rollers are fitted so as to rotate freely around shafts which themselves are solidly attached to the housing of the hoisting device.

15. Hoisting device according to claim [1] *6,* characterized by the fact that the two half pulleys are joined together by means of bolts located along a circle and which are fixed in one half pulley and along which the other half pulley is free to move, whereby spring means are provided [such as dished springs for instance], between each bolt head and the adjacent half pulley, the arrangement being such that the pulley halves act on the cable, alongst the largest part of their circumference, in parallel direction and with a substantially constant pressure, the deflection imparted by said [roll or] ring occurring only at the place of entry and exit of the cable.

16. Hoisting device according to claim 1, characterized by the fact that the [groove of the cable] *the cable is received within an outer peripheral groove of said driving* pulley *and said groove* consists of a slanting surface on the inner wall of each half [element] of the pulley.

17. Hoisting device according to claim 16, characterized by the fact that aforesaid slanting surfaces form a groove which progressively widens from the outer *peripheral* edge of the pulley towards the inside.

18. Hoisting device according to claim 1, characterized by the fact that aforesaid groove is of dovetail [shape] *cross-sectional configuration.*

[19. Hoisting device according to claim 1, characterized by the fact that it mainly consists of the combination of a housing to which the load is suspended, and in this housing a driving pulley consisting of two half pulleys for the cable, which is suspended from some fixed point, whereby the two half pulleys, at least one of which is made so as to be distortable, are joined together by means of bolts located along a circle and which are fixed to one half pulley, and over which the other half pulley is free to move, whereby spring means are provided, such as for instance, dished springs, between each bolt head and the adjacent half pulley, one and other in such a manner that the half pulleys are continuously being pressed towards each other by a constant adjustable and uniform or almost uniform pressure, and whereby a roller or ring is provided, between and within the outer circumference of aforesaid half pulleys, which is located excentrically and which presses the half pulleys away from each other, one and other in such a manner that on the one hand, the cable which is fitted in a dovetail shaped groove is being gripped over a large arc with a uniform or almost uniform pressure, and on the other hand, that by local and temporary distortion of one or of both half pulleys the cable can enter and leave the driving pulley without friction and without or practically without alteration of the pressure exerted by aforementioned springs upon the cable.]

[20. Hoisting device according to claim 1, characterized by the fact that it consists mainly of a combination of a cable pulley; distributed along the circumference of this pulley, pairs of gripping elements under spring pressure for firmly pressing the cable, and means which press the pairs of gripping elements away from each other at the locations where the cable enters and leaves the pulley.]

[21. Hoisting device according to claim 20, characterized by the fact that aforesaid gripping elements each consist of an L shaped block which is attached so as to be free to move on one side of the pulley and which reaches over the cable.]

[22. Hoisting device according to claim 21, characterized by the fact that aforementioned block is provided, at the location of the cable, with a bevelled surface.]

[23. Hoisting device according to claim 21, characterized by the fact that each block is provided with a leaf spring or suchlike which constantly presses the block towards the cable.]

[24. Hoisting device according to claim 23, characterized by the fact that aforesaid blocks are each provided with rollers which can cooperate with means which locally press the pairs of blocks away from each other.]

[25. Hoisting device according to claim 23, characterized by the fact that aforementioned means consist of two guides or cams.]

26. Hoisting device according to claim 2, characterized by the fact that [aforesaid distortable half pulley is made of at least 2 parts] *only said outer peripheral portion of said one half pulley is resiliently deformable.*

27. Hoisting device according to claim 3, characterized by the fact that [aforesaid distortable half pulleys are each made of at least two parts] *only said outer peripheral portions of said half pulleys are resiliently deformable.*

*28. A hoisting device comprising:*

*a housing;*

*a shaft supported by said housing for rotation about a central axis;*

*a first pulley member rotatively driven by said shaft and extending radially outwardly of said central axis;*

*a second pulley member supported for conjoint rotation with said first pulley member adjacent one side thereof;*

*said members having outer peripheral portions providing a radially outwardly open cable receiving groove with surfaces thereof encircling spaced axially with respect to said central axis;*

*biasing means carried by at least one of said members for biasing said surfaces towards each other with respect to said central axis to permit a cable to be gripped therebetween;*

*and means located between said members and engagable with said members to displace only that portion of at least one of said members moving through a limited arc of said conjoint rotation to permit entrance and exit of a cable to and from one portion of said cable receiving groove while retaining a cable within the entire remaining portion of said cable receiving groove substantially only by the bias of said biasing means.*

*29. A hoisting device as set forth in claim 28 wherein said second pulley member is supported by said first pulley member and said biasing means includes support means carried by said first pulley member.*

*30. A hoisting device as set forth in claim 28 wherein said biasing means comprises a plurality of circumferentially spaced members and said last mentioned means sequentially overcomes the bias of certain ones of said circumferentially spaced members.*

*31. A hoisting device as set forth in claim 28 wherein said last mentioned means comprises a ring rotatable about a rotative axis parallel to said central axis.*

*32. A hoisting device as set forth in claim 31 wherein said axes are located in a plane extending at substantially 45 degrees to a horizontal plane.*

*33. A hoisting device as set forth in claim 31 wherein said ring has outwardly convergent surfaces on the outer periphery thereof which are cooperable with respective outwardly convergent surfaces on said members located radially inwardly of said groove.*

*34. A hoisting device as set forth in claim 33 wherein the cooperation of said outwardly convergent surfaces occurs during said limited arc of said conjoint rotation.*

*35. A hoisting device as set forth in claim 34 wherein at least an outer peripheral portion of one of said members is resiliently deformable and during said limited arc of said conjoint rotation said cooperation of said outwardly convergent surfaces deforms said outer peripheral portion away from the other of said members with respect to said central axis.*

*36. A hoisting device as specified in claim 35 wherein the elastic limit of said outer peripheral portion is not exceeded during said deformation.*

*37. A hoisting device as specified in claim 36 wherein substantially all of said one of said members is resiliently deformable.*

*38. A hoisting device as set forth in claim 34 wherein at least the outer peripheral portions of both of said members is resiliently deformable and during said limited arc of conjoint rotation said outwardly convergent surfaces deform said outer peripheral portions away from each other with respect to said central axis.*

*39. A hoisting device as specified in claim 38 wherein the elastic limit of said outer peripheral portions are not exceeded during said deformation.*

*40. A hoisting device as specified in claim 39 wherein substantially all of said members are deformable.*

*41. A hoisting device as specified in claim 31 wherein the rotation speed of said ring is similar to the rotation speed of said members.*

*42. A hoisting device as specified in claim 31 wherein said rotative axis is closely transversely adjacent said central axis.*

*43. A hoisting device as specified in claim 31 wherein said last mentioned means is supported by said housing.*

*44. A hoisting device as specified in claim 31 including support means carried by said housing for the support of said last mentioned means and said last mentioned means are rotatable with respect to said support means.*

* * * * *